United States Patent [19]

Stewart, Jr.

[11] Patent Number: 4,670,300
[45] Date of Patent: Jun. 2, 1987

[54] CARBON-GRAPHITE COMPONENT FOR AN ELECTROCHEMICAL CELL AND METHOD FOR MAKING THE COMPONENT

[75] Inventor: Robert C. Stewart, Jr., West Suffield, Conn.

[73] Assignee: International Fuel Cells Corporation, South Windsor, Conn.

[21] Appl. No.: 751,636

[22] Filed: Jul. 3, 1985

[51] Int. Cl.⁴ .................................. H01M 4/88
[52] U.S. Cl. .................... 427/115; 427/121; 427/122; 264/29.1; 264/29.4
[58] Field of Search ............... 264/29.1, 29.4; 427/121, 115, 122

[56] References Cited

U.S. PATENT DOCUMENTS

| | | | |
|---|---|---|---|
| 2,664,453 | 12/1953 | Lang | 136/121 |
| 3,779,811 | 12/1973 | Bushnell et al. | 136/86 R |
| 3,855,002 | 12/1974 | Schroll | 136/86 R |
| 3,867,206 | 2/1975 | Trocciola et al. | 136/86 D |
| 3,905,832 | 9/1975 | Trocciola | 136/86 R |
| 3,972,735 | 8/1976 | Breault | 136/122 |
| 3,990,913 | 11/1976 | Tuschner | 429/26 |
| 4,017,663 | 4/1977 | Breault | 429/12 |
| 4,035,551 | 7/1977 | Grevstad | 429/44 |
| 4,038,463 | 7/1977 | Lamarine et al. | 429/44 |
| 4,041,116 | 8/1977 | Baud | 162/157.1 |
| 4,043,933 | 8/1977 | Breault et al. | 252/182 |
| 4,064,207 | 12/1977 | DeCrescente et al. | 264/29.6 |
| 4,064,322 | 12/1977 | Bushnell et al. | 429/41 |
| 4,080,413 | 3/1978 | Layden et al. | 264/29.2 |
| 4,115,528 | 9/1978 | Christner et al. | 423/449 |
| 4,165,349 | 8/1979 | Sandelli | 264/29.1 |
| 4,173,662 | 11/1979 | Stewart, Jr. | 427/115 |
| 4,185,131 | 1/1980 | Goller et al. | 427/113 |
| 4,185,145 | 1/1980 | Breault | 429/34 |
| 4,219,611 | 8/1980 | Breault | 429/13 |
| 4,233,369 | 11/1980 | Breault et al. | 429/26 |
| 4,245,009 | 1/1981 | Guthrie | 429/16 |
| 4,259,389 | 3/1981 | Vine et al. | 428/192 |
| 4,269,642 | 5/1981 | DeCasperis et al. | 156/89 |
| 4,279,970 | 7/1981 | Breault et al. | 429/35 |
| 4,287,232 | 9/1981 | Goller et al. | 427/113 |
| 4,313,972 | 2/1982 | Goller et al. | 427/113 |
| 4,360,485 | 11/1982 | Emanuelson et al. | 264/29.5 |
| 4,365,008 | 12/1982 | DeCasperis et al. | 429/36 |
| 4,374,906 | 2/1983 | Breault et al. | 429/44 |
| 4,396,480 | 8/1983 | Hegedus et al. | 429/33 |
| 4,426,340 | 1/1984 | Goller et al. | 264/29.1 |
| 4,507,262 | 3/1985 | Karas et al. | 419/2 |

FOREIGN PATENT DOCUMENTS

| | | |
|---|---|---|
| 127887 | 12/1984 | European Pat. Off. ........... 264/29.4 |
| 187623 | 10/1984 | Japan ................................. 264/29.4 |
| 1075226 | 7/1967 | United Kingdom . |
| 1092271 | 11/1967 | United Kingdom . |
| 1421672 | 1/1976 | United Kingdom . |
| 2003124A | 3/1979 | United Kingdom . |

Primary Examiner— Bueker
Attorney, Agent, or Firm—Gene D. Fleischhauer

[57] ABSTRACT

A method for making a carbon-graphite component of the type adapted for use in an electrochemical cell is disclosed. The precursor sheet structure for the component contains cellulose and purified graphite powder which provides certain advantages during processing and in the final products.

9 Claims, 1 Drawing Figure

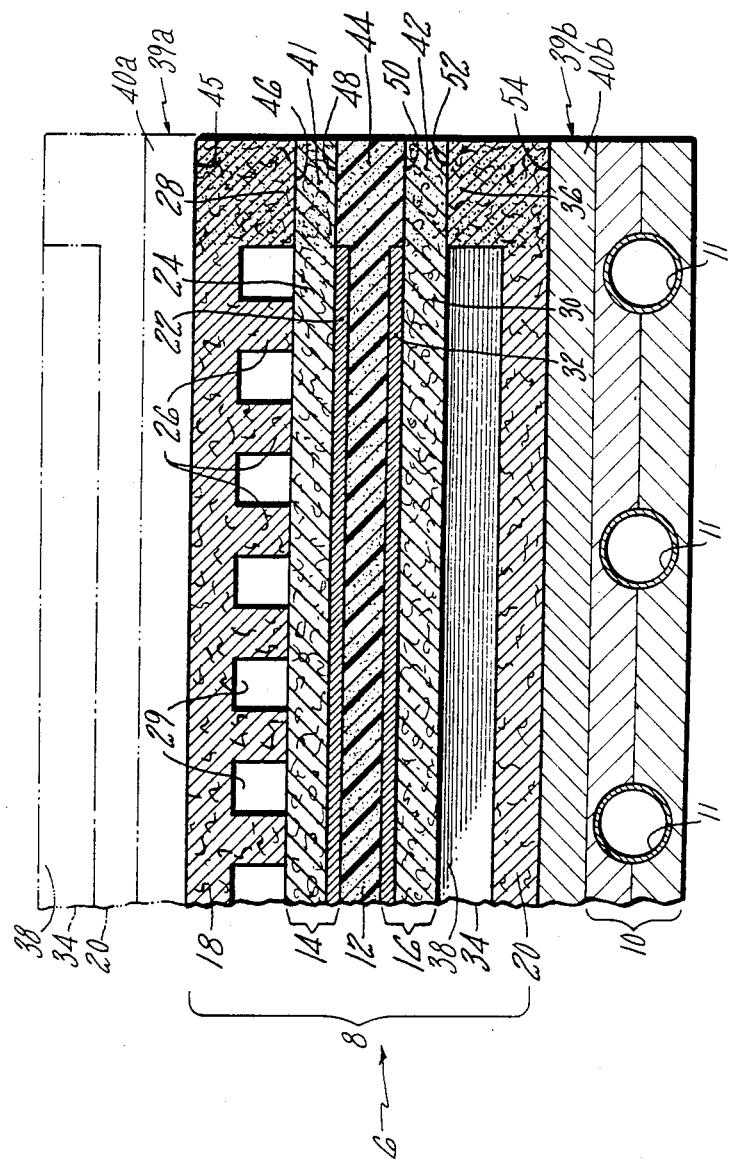

CARBON-GRAPHITE COMPONENT FOR AN ELECTROCHEMICAL CELL AND METHOD FOR MAKING THE COMPONENT

CROSS REFERENCE TO RELATED APPLICATION

This application relates to U.S. application Ser. No. 751,713, filed July 2, 1985 for CARBON-GRAPHITE COMPONENT FOR AN ELECTROCHEMICAL CELL AND METHOD FOR MAKING THE COMPONENT by John M. Lee et al.

TECHNICAL FIELD

This invention relates to carbon-graphite components of the type which are used in electrochemical cells such as fuel cell powerplants. Although this invention was developed for use in the field of phosphoric acid fuel cell powerplants, the invention may have application to any field employing carbon-graphite components.

BACKGROUND OF INVENTION

Fuel cell powerplants produce electric power by electrochemically consuming a fuel and an oxidant in one or more electrochemical cells. The oxidant may be pure oxygen or a mixture of gases containing oxygen, such as air. The fuel may be hydrogen.

Each fuel cell generally has electrodes for receiving the gases, such as an anode electrode for fuel and a cathode electrode for an oxidant. The cathode electrode is spaced from the anode electrode. A matrix saturated with electrolyte is disposed between the electrodes. Each electrode includes a substrate having a catalyst layer disposed on the side facing the electrolyte matrix. An electrolyte reservoir plate on the other side of the substrate is capable of providing electrolyte through small pores to the substrate. The electrolyte reservoir plate may have channels or passageways behind the substrate for carrying a reactant gas, such as gaseous fuel to the anode or gaseous oxidant to the cathode. For example, these channels might extend between parallel ribs on the substrate side of the electrolyte reservoir plate. A separator plate on the other side of the electrolyte reservoir plate provides a barrier to the loss of electrolyte and prevents mixing of the fuel and oxidant gases in adjacent cells.

Generally, a stack of fuel cells and separator plates are used in performing the electrochemical reaction. As a result of the electrochemical reaction, the fuel cell stack produces electric power, a reactant product, and waste heat. A cooling system extends through the stack for removing the waste heat from the fuel cell stack. The cooling system has a coolant and conduits for the coolant which are disposed within the stack. Heat is transferred by cooler holders from the fuel cells to the conduits and from the conduits to the coolant.

The cooler holder must be electrically and thermally conductive and may be permeable to gas. An example of such a cooler holder is shown in U.S. Pat. No. 4,245,009 issued to Guthrie entitled "Porous Coolant Tube Holder for Fuel Cell Stack". Alternatively, the cooler holder might be impermeable to gas. An example of such a cooler holder is shown in U.S. Pat. No. 3,990,913 issued to Tuschner entitled "Phosphoric Acid Heat Transfer Material". In Tuschner, the cooler holder serves the double function of cooler holder and separator plate.

Separator plates prevent the mixing of the fuel gas, such as hydrogen, disposed on one side of the plate, with an oxidant, such as air, disposed on the other side of the plate. Separator plates are, therefore, highly impermeable to gases such as hydrogen and highly electrically conductive to pass the electrical current through the fuel cell stack. In addition, separator plates must also tolerate the highly corrosive atmosphere formed by the electrolyte used in the fuel cell. One example of such an electrolyte is hot, phosphoric acid. In addition, separator plates, like cooler holders, must be strong, particularly in terms of flexural strength, which is a measure of the ability of the separator plate to withstand high pressure loads, differential thermal expansion of mating components, and numerous thermal cycles without cracking or breaking.

An example of a method for making separator plates for electrochemical cells is discussed in U.S. Pat. No. 4,360,485 issued to Emanuelson et al., the material in which is hereby incorporated by reference. In this method, the separator plate is formed by molding and then graphitizing a mixture of preferably 50 percent high purity graphite powder and 50 percent carbonizable thermosetting phenolic resin. In particular, Emanuelson discusses forming a well blended mixture of the appropriate resin and graphite powder. The mixture is then distributed in a mold. The mold is compacted under pressure and temperature to melt and partially cure the resin and to form the plate.

An electrolyte reservoir layer, such as the electrolyte reservoir plate and the electrode substrate, have requirements that differ from those for a separation plate. These layers or plates accommodate volume changes in the electrolyte during fuel cell operation. Examples of such electrolyte reservoir layers are shown in commonly owned U.S. Pat. Nos. 3,779,811; 3,905,832; 4,035,551; 4,038,463; 4,064,207; 4,080,413; 4,064,322; 4,185,145; and 4,374,906. Several of these patents show the electrolyte reservoir layer as a substrate. These substrates satisfy several functional requirements. For example, the substrate provides support to the catalyst layer and provides a means for the gaseous reactants to pass through the catalyst layer. The substrate may also provide, alone or in combination with an electrolyte reservoir plate, an electrolyte storage reservoir to accommodate changes in acid volume due to changes in operating conditions of the cell and due to electrolyte evaporation. The edges of the substrate are often required to function as a wet seal to prevent the escape of reactant gases and electrolyte from the cell. In addition to the foregoing requirements, the substrate must also be a good electrical conductor and a good thermal conductor and have adequate structural strength and long life.

One material commonly used as a reservoir layer in phosphoric acid electrolyte fuel cells is formed of carbon fibers bonded together with a resin such as a phenolic resin and heated to convert the resin and carbon fibers to graphite. Alternatively, carbon or graphite fibers may be bonded together with pyrolitic graphite by placing an amount of fibers in a decomposable hydrocarbon atmosphere (e.g., methane) under conditions which cause the hydrocarbon to break down into carbon and hydrogen The carbon (now pyrolitic graphite) deposits on the fibers. These two materials are available commerically and are commonly referred to as carbon papers.

Another material suggested for use in fuel cells, such as a potassium hydroxide fuel cell, is discussed in commonly owned U.S. Pat. No. 4,064,207 issued to DeCrescente et al. entitled "Porous Carbon Fuel Cell Electrode Substrates and Method of Manufacture". DeCrescente suggests making the substrate from any inexpensive material available in filament form which can be pyrolized to form a carbon fiber. Examples of such filaments are filaments comprised of acrylonitrile polymers and filaments comprised of naturally occurring cellulosic fiber such as rayon. The carbonizable filaments are uniformly distributed on a planar support to felt the fibers. A resin binder is thereafter applied typically by spraying. Thereafter, the felt is subjected to pyrolysis by heating.

Despite the existence of many methods for forming fuel cell components, such as the reservoir layers and impermeable plates, scientists and engineers are seeking to develop materials and methods of making the material for these components which lend themselves to high speed, mass production fabrication.

DISCLOSURE OF INVENTION

According to the present invention, a carbon-graphite component for use in electrochemical cells is formed from a mixture of cellulose fibers, high purity graphite and a carbonizable resin.

This invention is predicated in part on the recognition that the advantageous properties of cellulose fibers that enable modern, high speed, paper making are particularly advantageous in the manufacture of carbon-graphite components for electrochemical cells.

As used herein, cellulose fibers means cellulose fibers of the type suited for paper making and are generally unmodified cellulose fibers as obtained from pulping and bleaching operations that are refined by mechanically processing the fibers in beaters or refiners. Mechanically refining the cellulose fibers includes separating, crushing, fraying, fibrillating and cutting cellulose pulp fibers as set forth in the McGraw-Hill Encyclopedia of Science and Technology (5th Ed. 1982), the disclosure of which is incorporated herein by reference. As a result of mechanical refining, the fibers imbibe water and swell, becoming more flexible and more pliable. Their capacity to bond with one another on drying is greatly enhanced, partly through modification of the fiber surfaces and partly because of the creation of new surface area. Such cellulose fibers do not include cellulosic fibers, such as rayon or acetate, which are unsuited for paper making.

In accordance with the present invention, the method for making a carbon-graphite component of the type adapted for use in an electrochemical cell includes the steps of: forming a sheet structure composed of cellulose fibers, high purity graphite particles and a carbonizable thermosetting resin; heating the sheet structure to a first temperature range to carbonize the cellulose fibers and resin and heating the sheet structure to a second temperature range to graphitize the carbonized cellulose fibers and resin.

A primary feature of the present invention is the cellulose fibers present in a mixture of purified graphite and a carbonizable, thermosetting resin. Another feature is the structure of cellulose fibers which have fibrils extending like hooks from the main fiber. Another feature is the teodency of cellulose fibers to bond together when dried from an aqueous suspension. Another feature is the purified graphite which is disposed in the mixture.

A principal advantage of the present invention is the ability to use modern paper forming techniques to make the sheet structure for an electrochemical cell which results from the ability of the cellulose fibers to support and position the graphite particles and to bond to the other cellulose fibers. Still another advantage is the strength and uniformity of the finished structure which results from the resin in solution selectively migrating to the many points of contact formed by the fibrils and microfibrils and depositing at these locations. An advantage is the rigidity of the structure after carbonization which results from the carbonized resin bonding the carbonized cellulose fibers and graphite particles together. An advantage is the reduction in warpage and shrinkage and the enhanced electrical, mechanical, and thermal properties which result from the presence of graphite The foregoing features and advantages of the present invention will become more apparent in light of the following detailed description of the best mode for carrying out the invention and in the accompanying drawings.

BRIEF DESCRIPTION OF THE DRAWING

The sole figure is a transverse sectional view showing an electrochemical cell which includes a reservoir layer and a separator plate adjacent to a cooler holder.

BEST MODE FOR CARRYING OUT THE INVENTION

The sole figure is a cross-sectional view of a portion of a fuel cell stack 6. The fuel cell stack includes one or more fuel cells as represented by the fuel cell 8 and cooler holders, as represented by the single cooler holder 10, which are spaced at intervals between sets of fuel cells. The coolant holders are adapted to receive conduits 11 for a coolant.

Each fuel cell includes an electrolyte retaining matrix 12, disposed between an anode electrode 14 and a cathode electrode 16. The particular cell shown uses phosphoric acid as the electrolyte. An electrolyte reservoir plate 18 is adjacent the anode and an electrolyte reservoir plate 20 is adjacent the cathode. In an alternate construction, the electrolyte reservoir plates might be replaced by gas separator plates.

The anode electrode 14 has a catalyst layer 22 and a porous reservoir layer 24. The catalyst layer is bonded to the reservoir layer and is formed of catalyst particles bonded together with a hydrophobic material such as polytetrafluoroethylene. One such catalyst is platinum supported on carbon particles. The reservoir layer in this embodiment is also an electrode substrate since it supports the catalyst layer.

The porous electrolyte reservoir plate 18 has ribs 26 and an edge portion 28. The ribs are spaced apart leaving passages 29 for fuel therebetween. A suitable fuel, such as hydrogen, is flowed through the passages 29 between the reservoir layer and the electrolyte reservoir plate and thence to the catalyst layer 22.

Electrolyte movement within the cell occurs as a result of the capillarity of porous structures which develop capillary forces. The smaller the pore, the larger the capillary force and the greater the liquid retention capability. Electrolyte transfer between the matrix 12 and both the electrolyte reservoir plate 18 and reservoir layer 24 occurs directly through the pores of the catalyst layer 22 which is partially hydrophilic. The catalyst layer may have holes to aid in this liquid transfer.

In this example of a fuel cell, the cathode electrode 16 also has a reservoir layer 30 and a catalyst layer 32. The catalyst layer is bonded to the reservoir layer. In many applications, a reservoir layer may be provided on only one side of the cell.

Like the electrolyte reservoir plate 18 adjacent the anode, the electrolyte reservoir plate 20 adjacent the cathode has a plurality of ribs, as represented by the single rib 34, which are spaced apart to define passages 38 for the oxidant. These passages generally extend perpendicular to the passages 29. An oxidant, such as the oxygen contained in air, is flowed through these passages between the reservoir layer and the electrolyte reservoir plate and thence through the reservoir layer to the catalyst layer.

Separator plate 39a having an edge portion 40a and separator plate 39b having an edge portion 40b are used to separate the adjacent fuel cells. The separator plates prevent the hydrogen, which is flowed along passages 29, from mixing with the oxygen in air flowed along passages 38. The separator plates are highly impermeable to a gas such as hydrogen and highly electrical conductive to enable electron flow along the stack. The separator plates also block the leakage of electrolyte from reservoir layers within the cell.

In this example, the reservoir layers each have a peripheral sealing portion. For example, the reservoir layer 24 has a peripheral sealing portion 41, the reservoir layer 30 has a peripheral sealing portion 42 and the edge regions 28 and 36 of the electrolyte reservoir plates are peripheral sealing portions. These sealing portions are impregnated, such as with material of which the matrix 12 is made, in order that the entire volume of these portions remain essentially completely filled with electrolyte as long as the matrix 12 is filled with electrolyte. Liquid seals are thereby formed by sandwiching the sealing portions between the edge portion 40a of the upper gas separator plate and the edge portion 40b of the lower gas separator plate. These liquid seals are formed at the surfaces 45, 46, 48, 50, 52, and 54. This may be done in the manner described in U.S. Pat. No. 3,867,206 entitled "Wet Seal for Liquid Electrolyte Fuel Cells" issued to Trocciola et al. which is commonly owned with the present invention.

As shown, the components which form the electrochemical cell are plate-like structures which are molded or shaped to configurations which adapt them to their particular use.

Impermeable cooler holders and electrode substrates have been successfully manufactured using mass production techniques of the type used in the manufacture of paper. One approach is to form a mixture of cellulose fibers, graphite particles and a carbonizable, water dispersable, thermosetting resin, such as Bendix V 1129 available from the Bendix Company, Troy, New York. The mixture may be formed mechanically or by forming a dilute aqueous suspension consisting essentially of cellulose fibers, purified graphite powder and phenolic resin in the form of a slurry. Certain wet strength binders, such as other carbonizable resins and pH buffers may be present in minor amounts do not change the baric properties of the mixture.

After the suspension is formed, the pH of the suspension is adjusted to uniformly precipitate the resin from the water onto the cellulose fibers and carbon particles. The structure of the cellulose fibers provides a particular advantage when used with the resin in suspension. The cellulose fibers have fine fibrils which are visible under an optical microscope. The electron microscope shows that the fibrils are composed of still finer microfibrils or micellar strings. The microfibrils are thought to consist of numerous nearly parallel cellulose fiber molecules which are so exactly ordered at places that they form crystalline regions called crystallites or micelles. In addition, less ordered cellulose fibers chains may even be tangled. The many points of contact of these fibrils and microfibrils with each other and the graphite particles selectively attract the suspended resin and cause the resin to selectively migrate to the many points of contact and to deposit at these locations. As a result, a uniform dispersion of the resin with the graphite particles and cellulose fibers results.

After forming the suspension of cellulose fibers, graphite particles and deposited resin, modern paper forming techniques may be used to form the sheet structure. These techniques are of the type described in Halpern, "Paper Manufacture" (Noyes Publishers 1975), and described in Loeber, "Supplement to E. J. Labarre's Dictionary and Encyclopedia of Paper and Papermaking (Swets Publishing Service, distributed by Swets North America, Lewiston, N.Y., ISBN 90-265-0038-6), the disclosure of which is incorporated herein by reference. In such techniques, the slurry is typically deposited on a moving continuous wire belt or screen or alternatively on a series of rotary cylindrical filters. The cylinder or screen receives the slurry, separates the water from the slurry and forms a wet sheet. The wet sheet is continuously removed from the belt, screen, or filter, and transported by itself, by a supporting woolen felt or other means to the next location. At the next location, the sheet may be joined to other wet sheets from adjacent machines in order to form thicker laminated sheets or boards. The wet sheet is carried through a series of rolls to remove the water. The water is pressed out mechanically to some extent and the remaining water is removed by evaporation as the sheet passes over a series of steam heated cylindrical dryers.

The partially dried precursor sheet is flexible because the thermosetting, carbonizable resin is not completely cured. Prior to carbonization, the precursor sheet may be used as is or may be compressed by molding and heating to partially or completely cure the resin.

The purified graphite particles are disposed in the sheet in the form of a graphite powder. The very high purity graphite is critical to obtaining satisfactory components. An impurity is any material, other than graphite, which melts, evaporates, decomposes or interacts with either the graphite, the resin as it decomposes, or with the carbonized resin, or which ignites during carbonizing or graphitizing of the plate. These types of impurities cause voids or pin holes through the finished plate. An impurity may also be foreign material remaining in the separator plate which is not chemically or electrically compatible with the fuel cell environment, resulting in a higher corrosion rate or contamination of the electrolyte and ultimately the fuel cell catalyst. The most harmful impurities are lead, copper, bismuth, silver, cadmium, mercury and arsenic. The total amount of these impurities should not exceed about 100 ppm and is preferably less than 20 ppm. Other less harmful impurities include silicon, iron, sodium and potassium. The total of all impurities in the graphite powder must not exceed 1,500 ppm and is preferably less than 900 ppm, since too high a total will result in a excessively porous plate due to the volatilization of these impurities during heat treatment. Notwithstanding the foregoing, impurities cannot be tolerated in any amount which comprise particles greater than about 10 mils, as these particles would cause large, unacceptable defects in the finished plates. These properties are discussed in U.S. Pat. No. 4,360,485 issued to Emanuelson et al. entitled "Method for Making Improved Separator Plates for Electrochemical Cells", the material in which is incorporated herein by reference.

The use of graphite powder confers significant advantages on electrodes and other components made by this method. The presence of graphite reduces warping in firing and shrinkage is less than half that experienced with nongraphite containing cellulose fibers phenolic compositions. In addition, scrap losses due to firing defects are substantially less than scrap losses experienced with other formulations. Electrical and thermal properties are enhanced as compared with nongraphite containing cellulose fibers phenolic compositions.

During the use of the modern paper forming techniques for making the precursor sheet structure, the cellulose fibers performs the important function of supporting and positioning the graphite powder (particles) and, if the resin is mechanically mixed, the thermosetting resin. The cellulose fibers also tends to bind together which gives form and cohesion to the precursor sheet during operations prior to curing of the thermosetting resin. In some constructions, the resin might be added by spraying or dipping.

In making impermeable cooler holders or separator plates, the precursor sheet structure will include at least 20 percent to 80 percent by weight graphite powder with the remainder of the composition either cellulose fibers or approximately equal amounts of cellulose fibers and the carbonizable, thermosetting resin. Within this range, precursor sheet structures containing about 35 percent to 45 percent by weight graphite powder with the remainder approximately equal amounts by weight of cellulose fibers and organic resins have been tested and found entirely satisfactory. The amounts are considered approximately equal, if the difference is less than ten percent by weight of the nongraphite remainder.

EXAMPLE

Over 2,000 square feet of a sample material made to the assignee's specifications was produced by these conventional paper forming techniques for the assignee during a production run by Lydall Eastern, Inc. (Colonial Fiber Division) of Manchester, Connecticut. The material produced is designated as Lydall 81-87 and uses A-99 graphite powder manufactured by the Asbury Graphite Corporation, Asbury, New Jersey. Essentially 100 percent of the A-99 powder will pass through a 325 U.S. standard sieve and 70 percent will pass through a number 625 U.S. standard sieve. The particle size of the graphite powder ranges from 19 microns to 40 microns with trace amounts outside these limits and a mean particle size of 25 to 30 microns. A thermosetting, carbonizable phenolic resin was used as a binder. One resin thought satisfactory is Reichhold 24-655 phenolic resin available from the Varcum Chemical, a Division of Reichhold Chemicals, Inc., Niagara Falls, New York. Chemically equivalent resins may also be used and the use of a particular resin may be dictated by considerations of the particular type of paper making machinery and the familiarity of the manufacturer with particular resins.

The precursor sheet structure containing the cellulose fibers, high purity graphite particles and the partially cured carbonizable thermosetting phenolic resin was cut to size and placed in a mold. Each precursor sheet was heated to a temperature of 325° F., held for two minutes and then pressed at 300 psi. The temperature was then raised to 400° F. over a ten minute period where the sheet was held under 300 psi. The part was cooled to 300° F. and removed from the press. The molded precursor sheet was heated to carbonize the phenolic resin and cellulose fibers. A typical carbonization cycle would be to gradually heat the sheet structure for 36 hours from ambient temperature to 1,850° F. (1,010° C.). The gradual heating is required to allow the gases generated during carbonization to escape. The material is held at this temperature for six hours and allowed to cool gradually over a period of 72 to 100 hours to ambient temperature. The heating cures any uncured resin and causes carbonization of the cellulose fibers and the carbonizable resin transforming at least 30 percent by weight of the resin and the cellulose fibers into carbon. After the precursor sheet structure is carbonized, the carbonizable resin bonds the carbonized cellulose fibers and graphite particles together causing the sheet structure to maintain its structural integrity.

After carbonization, the sheet structure was heated to a second, higher temperature range to graphitize the carbon which is formed during the carbonization cycle. This may be done, for example, by heating the structure gradually for a period of 48 hours from ambient temperature to a temperature of 5,000° F. (about 2,760° C.). After being raised to this temperature in an inert or reducing atmosphere, the sheet structure was cooled over a period of 500 hours to ambient temperature. The particular times and temperature ranges may be varied with increased temperatures allowing for decreased times. The cooling time may be considerably shortened to as little as 48 hours under laboratory conditions.

The cooler holder made as set forth is considered to be a satisfactory cooler holder for use in a phosphoric acid fuel cell powerplant.

The finished separator plate was 6.0 inch by 6.0 inch by one-hundred fifty thousandths (0.150) of an inch thick. The separator plate had the following physical characteristics: flexural strength 537 psi; thru-plane electrical resistivity at 100 psi and 100 amps per square foot was 0.26 ohm-cm; compressive yield strength, 100 psi; threshold corrosion potential 1130 mV; thru-plane thermal conductivity 4.0 BTU/hour-foot- ° F.; and plate density 0.63 g/cc.

EXAMPLE

A substrate for an electrode employing graphite powder, such as of about 5 to 35 percent by weight with the remainder equally divided between the cellulose fibers and phenolic resin, was formed to assignee's specifications by using the same techniques. In particular, the graphite particles were present in an amount of 35 percent by weight. The precursor material was designated as Lydall 81-148-2A. The electrode precursor sheet was not press cured or densified prior to carbonization. It was carbonized and graphitized as indicated previously.

The resulting substrate had the following characteristics: flexural strength 175 psi; thru-plane thermal conductivity 2.0 BTU/hour-foot-° Fahrenheit; a mean pore size of 28 microns; a corrosion potential of 1,100 mV; and a density of 0.41 g/cc. The substrate performed its intended function in its intended environment. Although the pore size was smaller than desired, it fell within the desired range of twenty to thirty microns. Table I shows that a fuel cell electrode formed using this substrate performed satisfactorily.

TABLE I

Summary of Peak and End Performance-Lydall 81-148

| | Hours of Performance | Performance (mv) | $O_2$ Gain (mv) | $H_2$ Gain (mv) | Internal Resistance (ohm/cm$^2$) | $O_2$ Activity |
|---|---|---|---|---|---|---|
| Peak | 76 | 638 | 80 | 23 | 28 | 34.1 |
| End | 1180 | 621 | 91 | 24 | 27 | 29.1 |
| Change | | | +11 | +1 | +1 | −5 |

This particular fuel cell was formed from a two inch by two inch test cell employing a catalyst of platinum deposited on carbon. The test cell was run for about 1,200 hours. As shown in Table I, the output at termination of the endurance run was 622 mV. A comparison of diagnostics made at peak performance and at termination showed that both performance losses were within normal limits. No substrate corrosion damage was detected after 1,000 hours of exposure to standard test conditions.

Although the invention has been shown and described with respect to detailed embodiments thereof, it should be understood by those skilled in the art that various changes in form and detail thereof may be made without departing from the spirit and the scope of the claimed invention.

I claim:

1. A method for making a carbon-graphite component suited for use in an electrochemical cell, comprising:
   forming a precursor sheet structure consisting essentially of a mixture of cellulose fibers, purified graphite particles and a carbonizable, thermosetting resin wherein the cellulose fibers support and position the purified graphite particles;
   heating the sheet structure to a first temperature range to carbonize the cellulose fibers and thermosetting resin wherein the carbonized resin bonds the carbonized cellulose fibers and graphite particles together;
   heating the sheet structure to a second, higher temperature range to graphitize the carbonized cellulose fibers and resin.

2. The method of making a carbon-graphite component of claim 1 wherein the component is particularly adapted for use as a reservoir layer for retaining electrolyte and wherein the step of forming the sheet structure includes the step of preparing a mixture consisting essentially of said cellulose fibers, said resin and five percent to thirty-five percent by weight purified graphite particles.

3. The method of making a carbon-graphite component of claim 2 wherein the mixture consists essentially of cellulose fibers, thermosetting resin and five percent to thirty-five percent by weight graphite particles, the mixture containing approximately equal amounts by weight of said cellulose fibers and said resin.

4. The method of making a carbon-graphite component of claim 1 wherein the component is particularly adapted to block the movement of electrolyte and wherein the mixture consists essentially of said cellulose fibers, said thermosetting resin and at least twenty percent to eighty percent by weight purified graphite particles with the remainder approximately equal amounts by weight of said cellulose fibers and said resin.

5. The method of making a carbon-graphite component of claim 4 wherein said mixture consists essentially of cellulose fibers, thermosetting resin and thirty-five percent to forty-five percent by weight purified graphite particles.

6. The method of making a carbon-graphite component of claim 1 wherein the step of forming a precursor sheet structure includes the step of heating the precursor sheet structure to cure said thermosetting resin.

7. The method of making a carbon-graphite component of claim 6 wherein the step of forming a precursor sheet structure includes the step of applying pressure to the precursor sheet structure before the precursor sheet structure is cured.

8. The method of making a carbon-graphite component of claims 1, 2, 3, 4, 5, 6, or 7 wherein said resin is a phenolic resin.

9. The method of making a carbon-graphite component of claim 8 wherein the step of forming the precursor sheet structure includes forming an aqueous suspension consisting essentially of cellulose fibers, purified graphite particles and phenolic resin and depositing the resin from the water onto the cellulose fibers and graphite particles.

* * * * *